(12) United States Patent
Kanehara et al.

(10) Patent No.: US 6,482,117 B1
(45) Date of Patent: Nov. 19, 2002

(54) METHOD OF CONTROLLING SPEED CHANGING RATE FOR METAL BELT TYPE NON-STAGE TRANSMISSIONS

(75) Inventors: Shigeru Kanehara, Wako (JP); Takamichi Shimada, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/673,646
(22) PCT Filed: Feb. 8, 1999
(86) PCT No.: PCT/JP99/00530
§ 371 (c)(1), (2), (4) Date: Oct. 31, 2000
(87) PCT Pub. No.: WO99/58882
PCT Pub. Date: Nov. 18, 1999

(30) Foreign Application Priority Data

May 8, 1998 (JP) .................................. 10-125743

(51) Int. Cl.⁷ ............................ F16G 5/16; F16G 1/22
(52) U.S. Cl. ...................... 474/242; 474/474; 474/201
(58) Field of Search ................... 474/242, 245, 474/201, 18, 28, 8, 37; 477/46, 48, 45, 44

(56) References Cited

U.S. PATENT DOCUMENTS 4,819,514 A * 4/1989 Yamamuro et al. ........... 474/18
5,094,652 A * 3/1992 Sakakibara et al. ........... 474/46
5,964,818 A * 10/1999 Kanehara et al. ............. 477/37
6,315,693 B1 * 11/2001 Tayama ......................... 474/28

FOREIGN PATENT DOCUMENTS

| JP | 2-191239 | 8/1987 |
| JP | 4-92155 | 3/1992 |
| JP | 8-296708 | 11/1996 |

\* cited by examiner

*Primary Examiner*—David A. Bucci
*Assistant Examiner*—Marcus Charles
(74) *Attorney, Agent, or Firm*—Arent Fox Kintner Plotkin & Kahn (57) ABSTRACT

In a metal belt-type continuously variable transmission, the radius of winding a metal belt around a drive pulley is increased to change the shift ratio i by applying a larger first axial thrust to the drive pulley and a smaller second axial thrust to a driven pulley during upshifting. In a region B where the relationship between a first axial thrust and the gear shifting speed dR/ds defined as a value obtained by differentiating the radius R of winding of the metal belt around the drive pulley by an amount s of tangential movement of the metal belt is maintained substantially linearly, the first axial thrust is subjected to a feedforward control based on a target gear shifting speed dR/ds. In regions A and C where the relationship between the first axial thrust and the gear shifting speed dR/ds is not maintained substantially linearly, the first axial thrust is subjected to a feedback control, so that the gear shifting speed dR/ds is equal to the target gear shifting speed dR/ds.

2 Claims, 11 Drawing Sheets

DRIVE PULLEY DURING UPSHIFTING

FIG.7B

DRIVEN PULLEY DURING DOWNSHIFTING

FIG.8A

DRIVE PULLEY DURING UPSHIFTING

FIG.8B

DRIVEN PULLEY DURING DOWNSHIFTING

METHOD OF CONTROLLING SPEED CHANGING RATE FOR METAL BELT TYPE NON-STAGE TRANSMISSIONS

FIELD OF THE INVENTION

The present invention relates to a metal belt-type continuously variable transmission including a metal belt wound around a drive pulley and a driven pulley, and particularly, to a process for controlling the gear shifting speed to obtain a target gear shifting speed in a gear-shifting transient state.

PRIOR ART

The change in shift ratio in such metal belt-type continuously variable transmission is carried out by applying a smaller axial thrust to one of a drive pulley and a driven pulley, applying a larger axial thrust to the other pulley, increasing the groove width of the one pulley to decrease the radius of winding of the metal belt around the one pulley, and decreasing the groove width of the other pulley to increase the radius of winding of the metal belt around the other pulley. In this case, as the value of the larger axial thrust applied to the other pulley is increased, the groove width of the pulley is decreased quickly to increase the gear shifting speed. Reversely, as the value of the larger axial thrust is decreased, the groove width of the pulley is decreased slowly to decrease the gear shifting speed.

However, it has not been conventionally sufficiently recognized how the gear shifting speed is determined in the gear shifting transient state of the metal belt-type continuously variable transmission. For this reason, an axial thrust required for obtaining a target gear shifting speed could not be predicted at the time of designing. Therefore, there are problems that it is difficult to design a hydraulic pressure system formed to apply an axial thrust to a pulley, that the gear shifting speed of a completed metal belt-type continuously variable transmission does not reach a target value, and that even when the target gear shifting speed is obtained, the efficiency is reduced due to an increase in friction caused by an excessive displacement of an oil pump. To solve these problems, the change in design of the hydraulic pressure system and the experiment must be repeatedly carried out, resulting in a problem that a lot of time and cost are required.

The present invention has been accomplished with the above circumstances in view, and it is an object of the present invention to ensure that the gear shifting speed of the metal belt-type continuously variable transmission can be controlled properly.

DISCLOSURE OF THE INVENTION

To achieve the above object, according to the present invention, there is provided a process for controlling a gear shifting speed in a metal belt-type continuously variable transmission comprising a metal belt comprised of a large number of metal elements carried on metal ring assemblies, the metal belt being wound around a drive pulley and a driven pulley, a first axial thrust being applied to one of the pulleys, and a second axial thrust smaller than the first axial thrust being applied to the other pulley, thereby increasing a radius of winding of the metal belt around the one pulley to which the first axial thrust has been applied, and decreasing a radius of winding of the metal belt around the other pulley to which the second axial thrust has been applied to change a shift ratio, characterized in that the first axial thrust is subjected to a feedforward control based on a target gear shifting speed in a region where the relationship between the first axial thrust and the gear shifting speed defined as a value obtained by differentiating the radius of winding of the metal belt around the one pulley by an amount of tangential movement of the metal belt is maintained substantially linearly.

With the above arrangement, in the region where the relationship between the first axial thrust and the gear shifting speed defined as the value obtained by differentiating the radius of winding of the metal belt around the one pulley by the amount of tangential movement of the metal belt is maintained substantially linearly, the first axial thrust is subjected to the feedforward control based on the target gear shifting speed. Therefore, the gear shifting speed can be controlled to the target value properly and stably. Moreover, the axial thrust required for obtaining the target gear shifting speed based on the relationship between the gear shifting speed and the first axial thrust can be predicted at the time of designing. Therefore, the capacity of the hydraulic pressure system can be suppressed to the bare minimum to avoid the reduction in efficiency and the increase in cost due to the increase in friction.

In addition to the above arrangement, there is provided a process for controlling a gear shifting speed in a metal belt-type continuously variable transmission, wherein the first axial thrust is subjected to a feedback control, so that the gear shifting speed becomes equal to the target gear shifting speed, in regions where the relationship between the gear shifting speed and the first axial thrust is not maintained substantially linearly.

With the above arrangement, the control of the gear shifting speed can be carried out without hindrance in all the regions by carrying out the feedback control in the regions where the feedforward control of the axial thrust is impossible.

BEST MODE FOR CARRYING OUT THE INVENTION

The mode for carrying out the present invention will now be described by way of an embodiment of the present invention shown in the accompanying drawings.

FIGS. 1 to 11 show an embodiment of the present invention.

Figure 1:
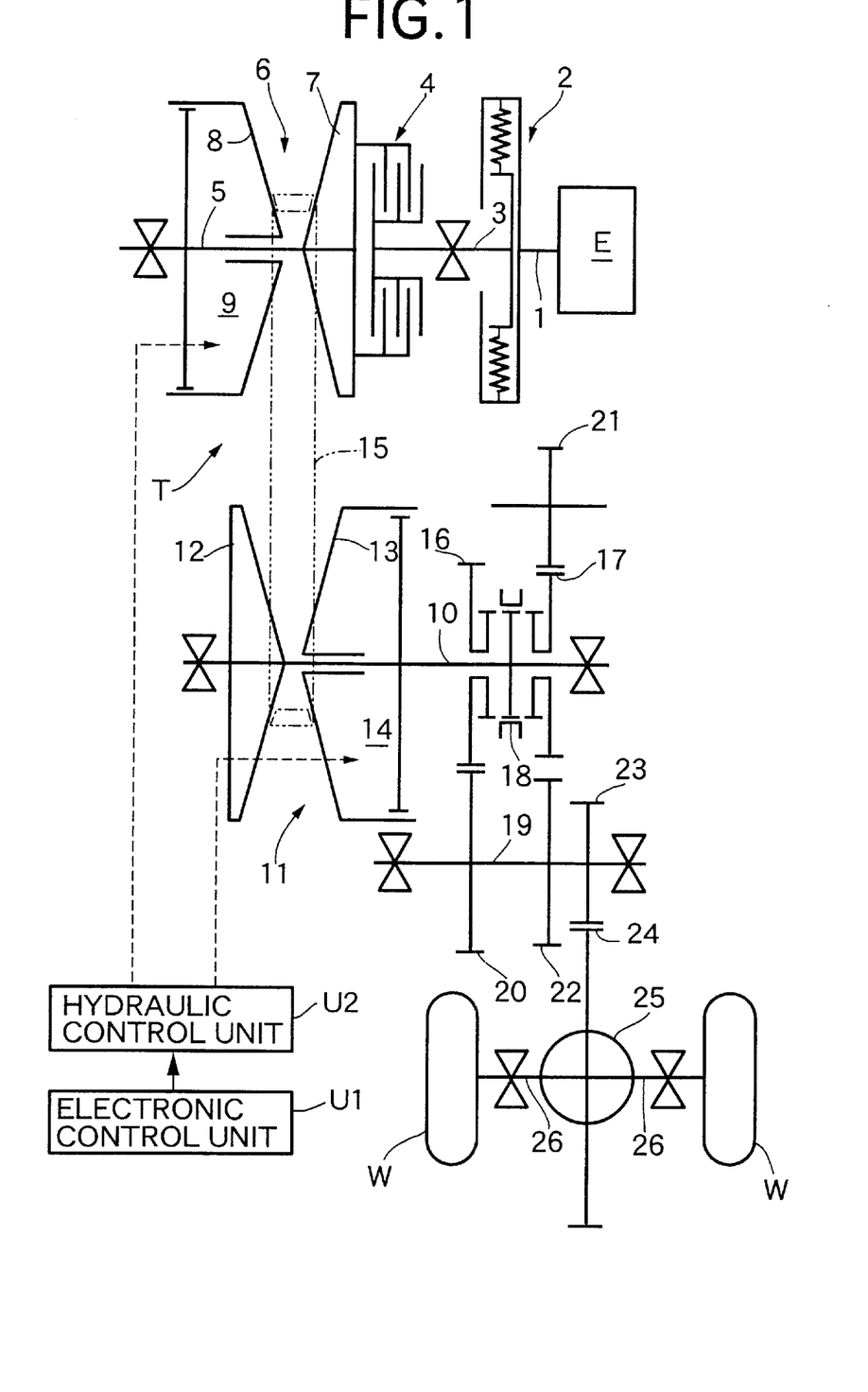
FIG. 1 is a skeleton illustration of a power transmitting system in a vehicle having a continuously variable transmission mounted thereon.
Figure 2:
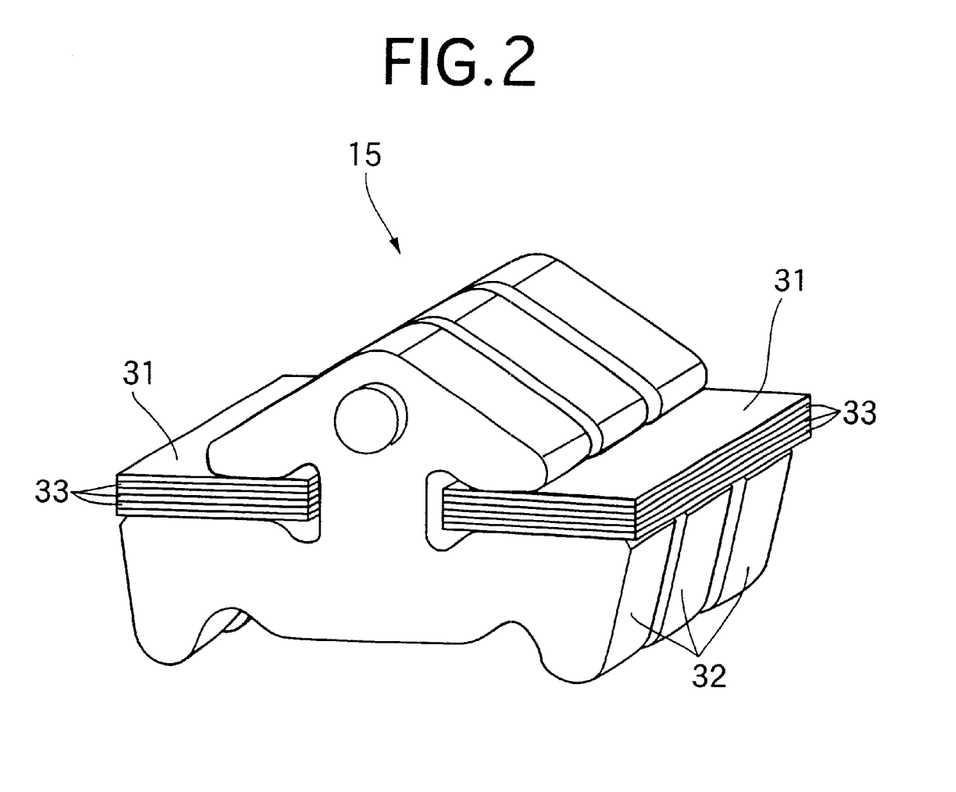
FIG. 2 is a partial perspective view of a metal belt.

FIG. 1 shows the skeleton structure of a metal belt-type continuously variable transmission T mounted on an automobile. An input shaft 3 is connected to a crankshaft 1 of an engine E through a damper 2 and also connected to a drive shaft 5 of the metal belt-type continuously variable transmission T through a starting clutch 4. A drive pulley 6 is mounted on the drive shaft 5 and includes a stationary pulley half 7 secured to the drive shaft 5, and a movable pulley half 8 which is movable toward and away from the stationary pulley half 7. The movable pulley half 8 is biased toward the stationary pulley half 7 by a hydraulic pressure applied to an oil chamber 9.

A driven pulley 11 is mounted on a driven shaft 10 disposed in parallel to the drive shaft 5, and includes a stationary pulley half 12 secured to the driven shaft 10, and a movable pulley half 13 which is movable toward and away from the stationary pulley half 12. The movable pulley half 13 is biased toward the stationary pulley half 12 by a hydraulic pressure applied to an oil chamber 14. A metal belt 15 comprising a large number of metal elements 32 supported on a pair of left and right metal ring assemblies 31, 31 is wound around the drive pulley 6 and the driven pulley 11 (see FIG. 2). Each of the metal ring assemblies 31 comprises twelve metal rings 33 laminated one on another.

A forward drive gear 16 and a backward drive gear 17 are rotatably carried on the driven shaft 10 and are capable of being selectively coupled to the driven shaft 10 by a selector 18. Secured to an output shaft 19 disposed in parallel to the driven shaft 10 are a forward driven gear 20 meshed with the forward drive gear 16, and a backward driven gear 22 meshed with the backward drive gear 17 through a backward idle gear 21.

The rotation of the output shaft 19 is inputted to a differential 25 through a final drive gear 23 and a final driven gear 24 and is then transmitted from the differential 25 through left and right axles 26, 26 to driven wheels W, W.

A driving force from the engine E is transmitted through the crankshaft 1, the damper 2, the input shaft 3, the starting clutch 4, the drive shaft 5, the drive pulley 6, the metal belt 15 and the driven pulley 11 to the driven shaft 10. When a forward travel range is selected, the driving force of the driven shaft 10 is transmitted through the forward drive gear 16 and the forward driven gear 20 to the output shaft 19 to move the vehicle forwards. When a backward travel range is selected, the driving force of the driven shaft 10 is transmitted through the backward drive gear 17, the backward idle gear 21 and the backward driven gear 22 to the output shaft 19 to move the vehicle backwards.

At this time, the shift ratio is regulated continuously by controlling the hydraulic pressures applied to the oil chamber 9 in the drive pulley 6 and the oil chamber 14 in the driven pulley 11 in the metal belt-type continuously variable transmission T by a hydraulic pressure control unit $U_2$ operated by a command from an electronic control unit $U_1$. For example, if the hydraulic pressure applied to the oil chamber 14 in the driven pulley 11 is increased relative to the hydraulic pressure applied to the oil chamber 9 in the drive pulley 6, i.e., if a first axial thrust $Q_{high}$ and a second axial thrust $Q_{low}$ ($Q_{high}>Q_{low}$) are applied to the driven pulley 11 and the drive pulley 6, respectively, the groove width of the driven pulley 11 is decreased, leading to an increased winding radius. Attendant on this, the groove width of the drive pulley 6 is increased, leading to a decreased winding radius. Therefore, the shift ratio of the metal belt-type continuously variable transmission T is varied continuously toward "LOW". Reversely, if the hydraulic pressure applied to the oil chamber 9 in the drive pulley 6 is increased relative to the hydraulic pressure applied to the oil chamber 14 in the driven pulley 11, i.e., if the first axial thrust $Q_{high}$ and the second axial thrust $Q_{low}$ ($Q_{high}>Q_{low}$) are applied to the drive pulley 6 and the driven pulley 11, respectively, the groove width of the drive pulley 6 is decreased, leading to an increased winding radius. Attendant on this, the groove width of the driven pulley 11 is increased, leading to a decreased winding radius. Therefore, the shift ratio of the metal belt-type continuously variable transmission T is varied continuously toward "TOP".

The concept of the average friction coefficient will be described below with reference to FIG. 3.

Figure 3:
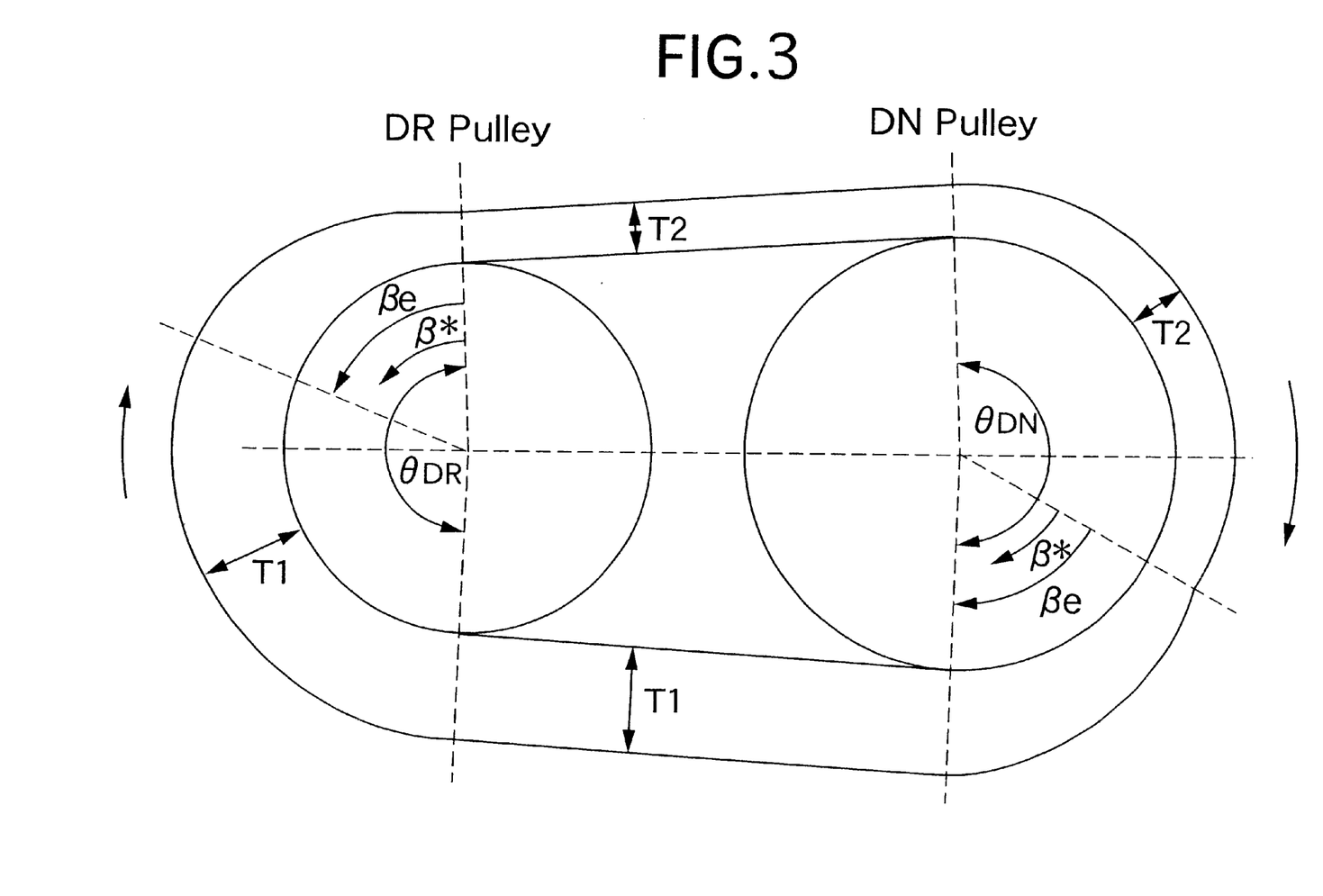
FIG. 3 is an illustration for explaining the concept of an average friction coefficient

FIG. 3 shows a state in which a sufficiently thin flat belt has been wound around the drive pulley and the driven pulley. The thickness of the belt in FIG. 3 diagrammatically represents the magnitude of the tension of the belt. If an apparent winding angle of the belt is represented by θ; a tension of the belt on the tensioned side is by $T_1$; a tension of the belt on the loosened side is by $T_2$; a friction coefficient between the belt and pulley is by $\mu$; and an angle measured from a point at which the tension of the belt starts to be varied from $T_2$ is by β*, the tension T of the belt is given according to the following equation by a Euler friction belt transmitting theory in which the slipping of the belt on the pulley is taken into consideration. The equation (1) is established for both of the drive pulley and the driven pulley:

$$T=T_2 \exp(\mu\beta^*) \qquad (1)$$

The transmission of the power between the belt and pulley is carried out in a region of 0<θ<βe (a section in which the tension T of the belt is varied), which is called an active arc. On the other hand, the transmission of the power between the belt and pulley is not carried out in a region in which the tension T is not varied and which is called an idle arc. The tension $T_1$ of the belt on the tensioned side is given according to the following equation using the equation (1):

$$T_1=T_2 \exp(\mu\beta e) \qquad (2)$$

In this way, the transmission of the power between the belt and pulley is carried out in practice in the active arc, but if it is considered that the transmission of the power is carried out in the entire region of the winding angle θ, the concept of an average friction coefficient $\mu_{AV}$ which is an apparent friction coefficient must be introduced in order to establish the following equation (3) in which βe in the equation (2) has been replaced by θ.

$$T_1=T_2 \exp(\mu_{AV}\theta) \qquad (3)$$

In the equation (3), the average friction coefficient $\mu_{AV}$ is given by the following equation (4):

$$\mu_{AV} = (1/\theta)\log(T_1/T_2) \quad (4)$$
$$= (1/\theta)\log(T_{IN}R_{DR}T_2 + 1)$$

wherein $T_{IN}$ is a torque inputted to the drive pulley; and $R_{DR}$ is a radius of winding of the metal belt around the drive pulley. The average friction coefficient $\mu_{AV}$ equal to 0 in a non-loaded state and is equal to $\mu$ in a fully-slipped state. Namely, the average friction coefficient $\mu_{AV}$ is a parameter indicating a proportion of slipping of the belt on the pulley. In a state in which the slipping of the belt is large, the average friction coefficient $\mu_{AV}$ is large, and reversely, in a state in which the slipping of the belt is small, the average friction coefficient $\mu_{AV}$ is small.

The term "friction coefficient" in the description which will be made hereinafter is referred to the above-described average friction coefficient $\mu_{AV}$.

Now, in the pulley around which the metal belt is wound with an increased radius in a gear shifting transient state in which the shift ratio of the metal belt-type continuously variable transmission is varied (i.e., in the pulley whose groove width is decreased by the axial thrust), the radius of winding of the metal belt is increased by movement of the metal element clamped in the V-face of the pulley in a radially outward direction. It was conventionally considered that the movement of the metal element in the radially outward direction occurs by slipping of the metal element on the V-face of the pulley, but it has been found that this movement occurs in practice by the resilient deformation of the metal element.

Figure 4A:
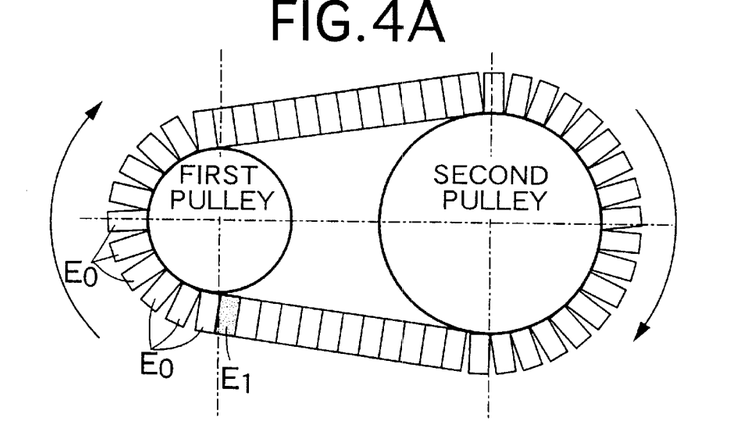
FIGS. 4A to 4C are diagrams for explaining an increase in radius of winding of the metal belt generated due to the resilient deformation of a metal element.
Figure 4B:
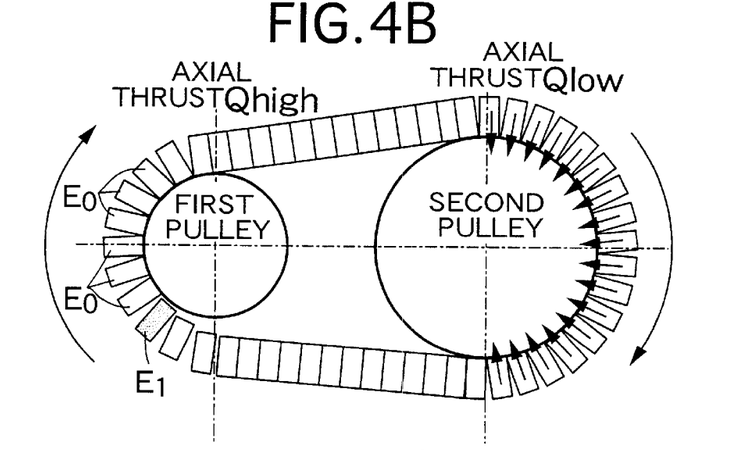

FIGS. 4 are diagrams for explaining the mechanism of the occurrence of such movement. The first pulley is a pulley to which the larger axial thrust $Q_{high}$ is applied, whereby the groove width of the pulley is decreased, and the radius of winding of the metal belt around the pulley is increased. The second pulley is a pulley to which the smaller axial thrust $Q_{low}$ is applied, whereby the groove width of the pulley is increased, and the radius of winding of the metal belt around the pulley is decreased. FIG. 4A shows a state before the gear shifting is started. In this case, a metal element $E_1$ shown by hatching is at a location immediately before it will be clamped in the V-groove in the first pulley. FIG. 4B shows a state immediately after the gear shifting has been started to cause the larger axial thrust $Q_{high}$ to be applied to the first pulley. In this case, a metal element $E_0$ already clamped in the V-face of the first pulley is compressed axially and deformed resiliently at that position without slipping, and the groove width of the first pulley is decreased with such compression. At this time, the metal element $E_1$ lying in a chord portion short of the first pulley is clamped in the V-face of the first pulley in a state in which it is not influenced by the axial thrust $Q_{high}$, namely in a state in which it is not compressed axially. Therefore, the metal element $E_1$ is clamped on a radially outer side than the compressed metal element $E_0$ located in front of the metal element $E_1$.

Figure 4C:
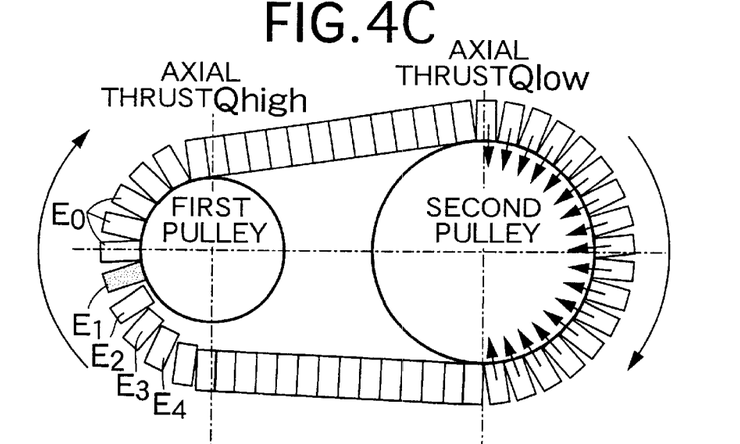

The metal element $E_1$ clamped in the V-face of the first pulley in the above manner is compressed axially by the action of the axial thrust $Q_{high}$ and deformed resiliently. For this reason, as shown in FIG. 4C, the succeeding metal elements $E_2, E_3, E_4$ - - - are clamped in the V-face of the first pulley while being sequentially offset radially outwards, and as a result, the radius of winding of the metal belt around the first pulley is increased. When the radius of winding of the metal belt around the first pulley is increased in this manner, the metal belt wound around the second pulley is drawn radially inwards, and the radius of winding of the metal belt around the second pulley is decreased by movement of the metal belt in the radially inward direction against the smaller axial thrust $Q_{low}$ applied to the second pulley. During this time, the metal element is slipping radially inwards in the entire region of the V-face of the second pulley.

Figure 5A:
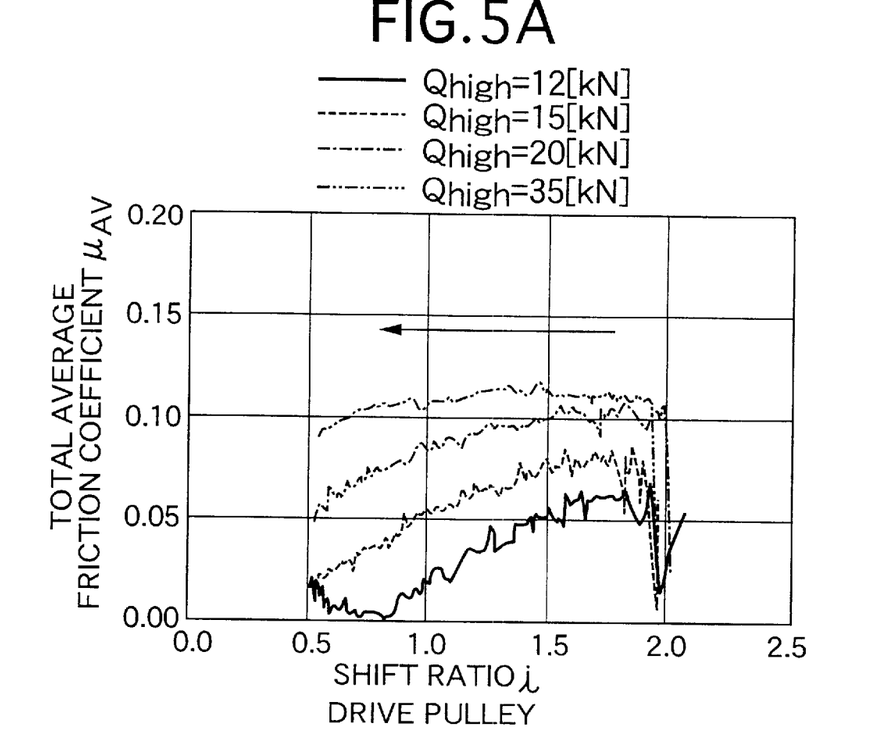
FIGS. 5A and 5B are graphs showing the relationship between a total average friction coefficient $\mu_{AV}$ and a shift ratio i in an upshifting course for various axial thrusts $Q_{high}$.
Figure 5B:
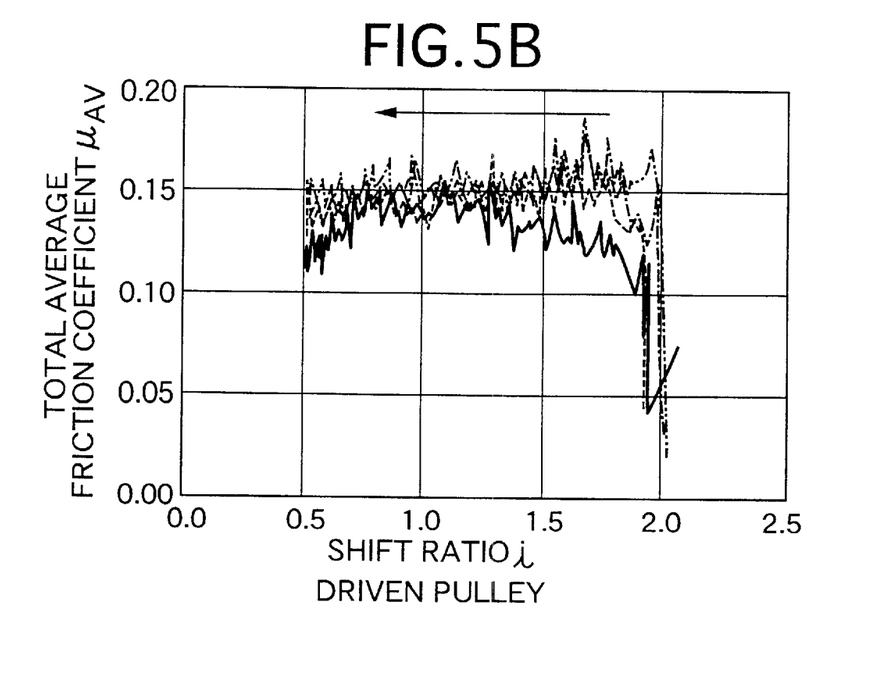

FIGS. 5 are graphs showing the relationship between the total average friction coefficient $\mu_{AV}$ and the shift ratio i in the upshifting course for the drive pulley and the driven pulley. In the drawings, the smaller axial thrust $Q_{low}$ is set at 6 kN; the input rotational speed $N_{IN}$ is set at 300 rpm; the input torque $T_{IN}$ is set at 0 Nm, and the larger axial thrust $Q_{high}$ is shown as being of four values of 12 kN, 15 kN, 20 kN and 35 kN. The total average friction coefficient $\mu_{AV}$ between the pulley and the metal element is defined by $$\mu_{AV} = (\mu_T^2 + \mu_R^2)^{1/2}$$

wherein $\mu_T$ represents an average tangential friction coefficient between the pulley and the metal element, and $\mu_R$ represents an average radial friction coefficient between the pulley and the metal element.

FIG. 5A corresponds to the drive pulley during the upshifting, i.e., the pulley around which the metal belt is wound with an increased radius. In this case, it can be seen that the total average friction coefficient $\mu_{AV}$ between the pulley and the metal element is increased with an increase in axial thrust $Q_{high}$ and hence, in the pulley around which the metal belt is wound with an increased radius, there is a region where the slipping does not occur between the pulley and the metal element. In that region where the slipping does not occur, the metal element is resiliently deformed by the axial thrust $Q_{high}$, and hence, the radius of winding of the metal belt around the drive pulley is increased for the above-described reason.

FIG. 5B corresponds to the driven pulley during the upshifting, i.e., the pulley around which the metal belt is wound with a decreased radius. In this case, it can be seen that the total average friction coefficient $\mu_{AV}$ between the pulley and the metal element is stabilized at a large value irrespective of the magnitude of the axial thrust $Q_{high}$ and therefore, in the pulley around which the metal belt is wound with the decreased radius, the full slipping has occurred between the pulley and the metal element.

Figure 6A:
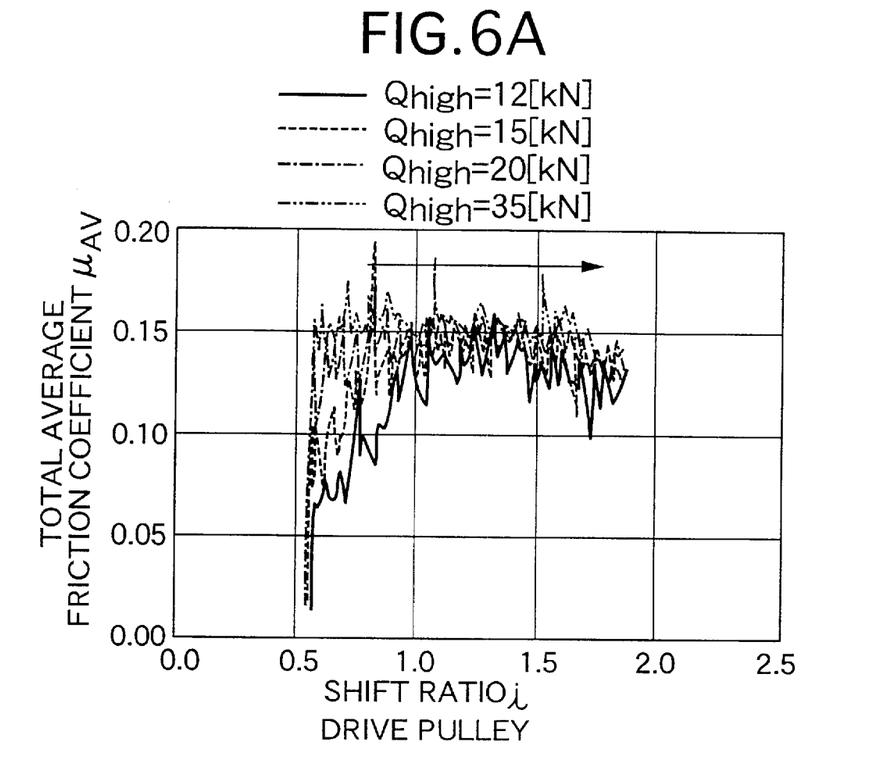
FIGS. 6A and 6B are graphs showing the relationship between the total average friction coefficient $\mu_{AV}$ and the shift ratio i in a downshifting course for various axial thrusts $Q_{high}$.
Figure 6B:
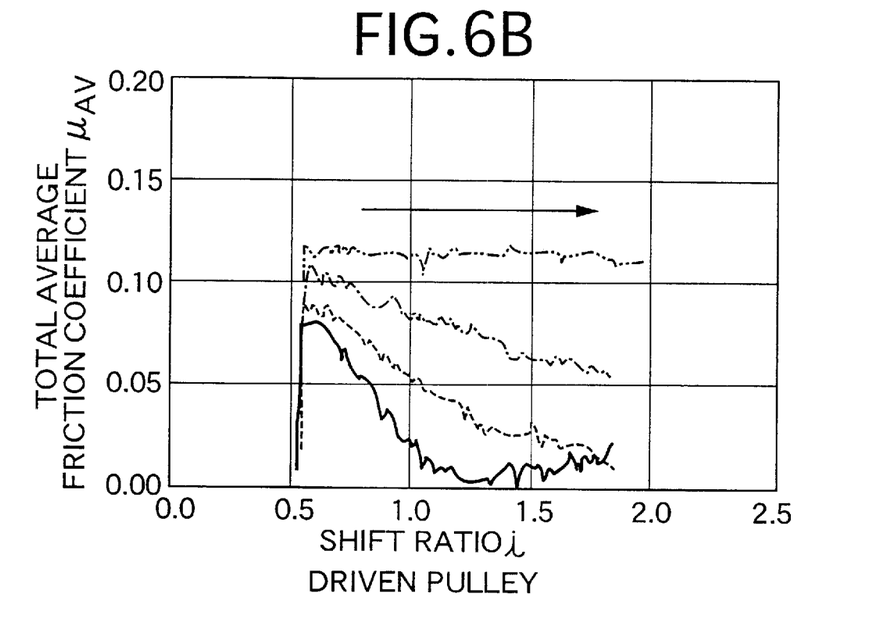

FIGS. 6 are graphs showing the relationship between the total average friction coefficient $\mu_{AV}$ and the shift ratio i in the downshifting course for the drive pulley and the driven pulley. In FIGS. 6A and 6B, the axial thrust $Q_{low}$, the axial thrust $Q_{high}$, the input rotational speed $N_{IN}$ and the input torque $T_{IN}$ are the same as those shown in FIGS. 5.

FIG. 6A corresponds to the drive pulley during the downshifting, i.e., the pulley around which the metal belt is wound with the decreased radius. In this case, it can be seen that the total average friction coefficient $\mu_{AV}$ between the pulley and the metal element is stabilized at a large value irrespective of the magnitude of the axial thrust $Q_{high}$ and therefore, in the pulley around which the metal belt is wound with the decreased radius, the full slipping has occurred between the pulley and the metal element.

FIG. 6B corresponds to the driven pulley during the downshifting, i.e., the pulley around which the metal belt is wound with the increased radius. In this case, it can be seen that the total average friction coefficient $\mu_{AV}$ between the pulley and the metal element is increased with an increase in the axial thrust $Q_{high}$ and therefore, in the pulley around which the metal belt is wound with the increased radius, there is a region where the slipping does not occur between the pulley and the metal element. In the region where the slipping does not occur, the metal element is resiliently deformed by the axial thrust $Q_{high}$ and hence, the radius of winding of the metal belt around the driven pulley is increased for the above-described reason.

Figure 7A:
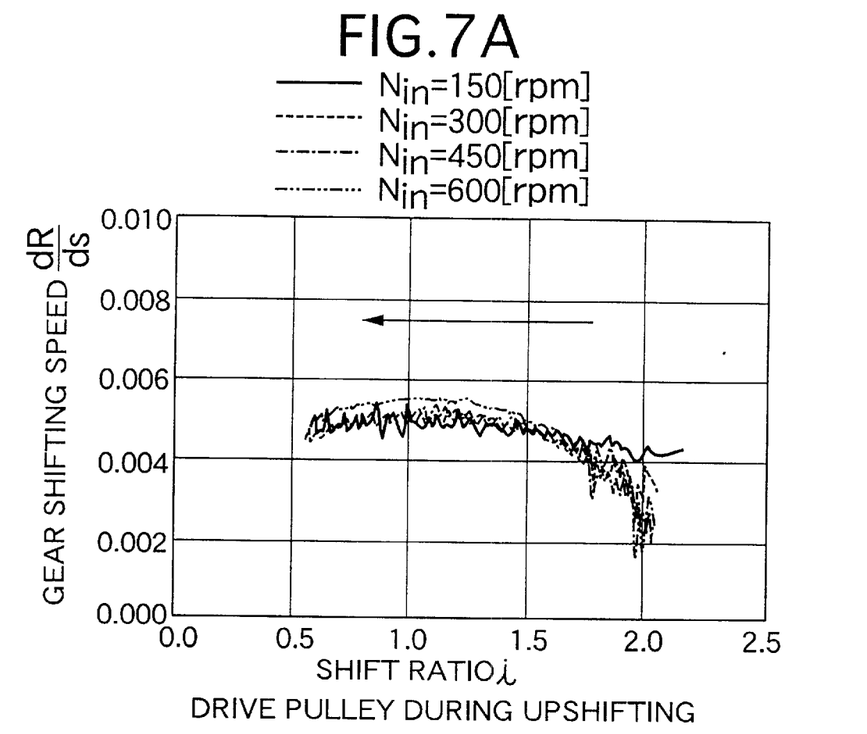
FIGS. 7A and 7B are graphs showing the relationship between a gear shifting speed dR/ds and the shift ratio i in a pulley around which the metal belt is wound with an increased radius for various input rotational speeds $N_{IN}$.
Figure 7B:
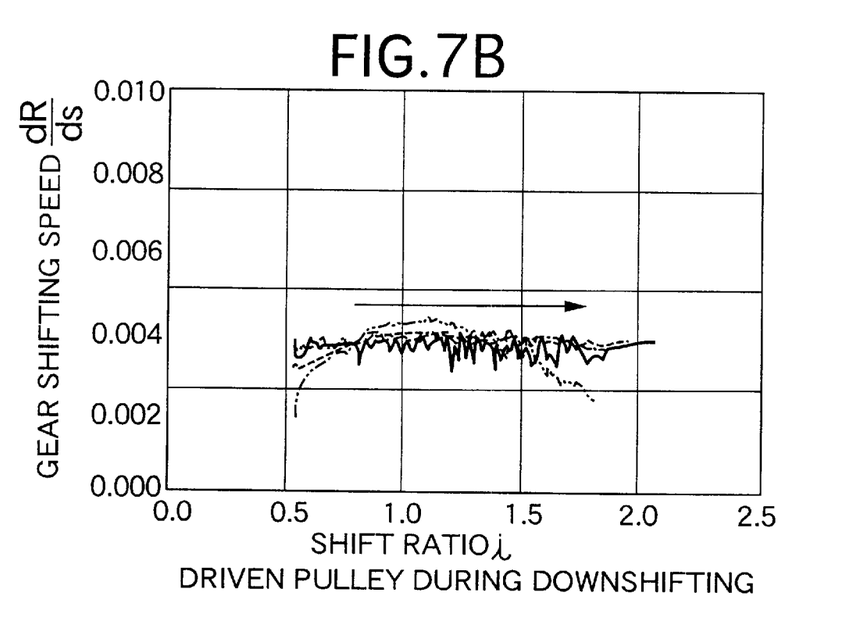

FIGS. 7A and 7B are graphs showing the relationship between the gear shifting speed dR/ds and the shift ratio i in the drive pulley during the upshifting and the driven pulley during downshifting, namely, in the pulley around which the metal belt is wound with an increased radius for various input rotational speeds $N_{IN}$. In FIGS. 7A and 7B, the smaller axial thrust $Q_{low}$ is set at 6 kN; the larger axial thrust $Q_{high}$ is set at 20 kN; the input torque $T_{IN}$ is set at 0 Nm, and the input rotational speed $N_{IN}$ is shown as being of four values of 150 rpm, 300 rpm, 450 rpm and 600 rpm. The gear shifting speed dR/ds is defined as a value obtained by differentiating the winding radius R around the pulley by the amount s of movement of the metal belt in a tangential direction.

As is apparent from FIGS. 7A and 7B, it is confirmed that in the pulley around which the metal belt is wound with the increased radius, the gear shifting speed dR/ds assumes a substantially constant value irrespective of the magnitude of the shift ratio i and the magnitude of the input rotational speed $N_{IN}$. The gear shifting speed dR/ds is a parameter representing how much the winding radius R has been increased when one metal element is clamped in the pulley. The fact that the gear shifting speed dR/ds assumes a substantially constant value irrespective of the magnitude of the shift ratio i and the magnitude of the input rotational speed $N_{IN}$, proves the validity of a gear shifting mechanism that when a new metal element described in FIG. 4 is clamped in the V-groove in the pulley, the metal element is offset radially outwards and as a result, the radius of winding of the metal belt is increased.

Figure 8A:
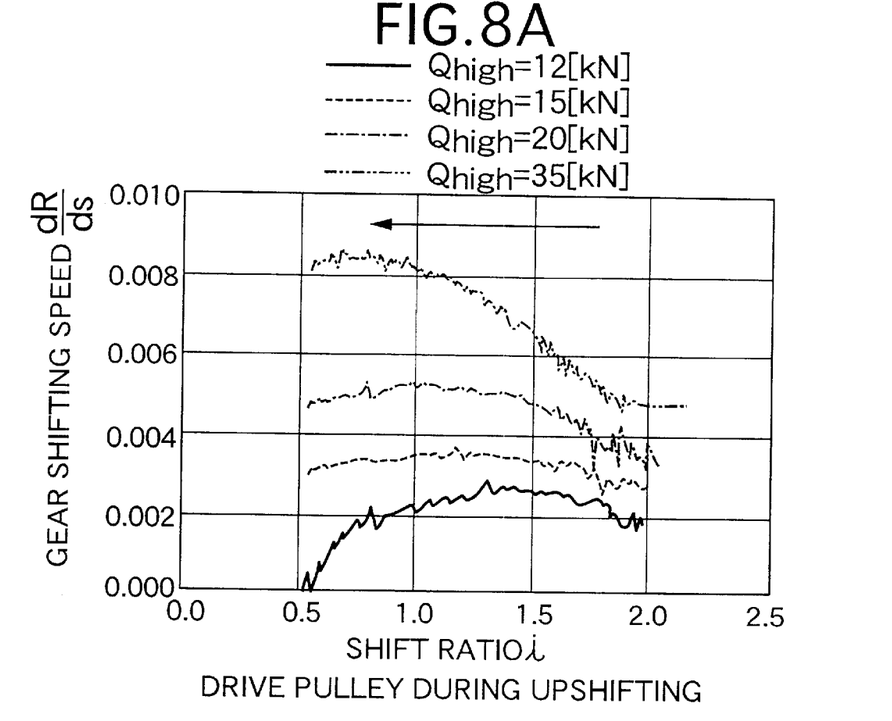
FIGS. 8A and 8B are graphs showing the relationship between the gear shifting speed dR/ds and the shift ratio i in the pulley around which the metal belt is wound with an increased radius for various axial thrusts $Q_{high}$.
Figure 8B:
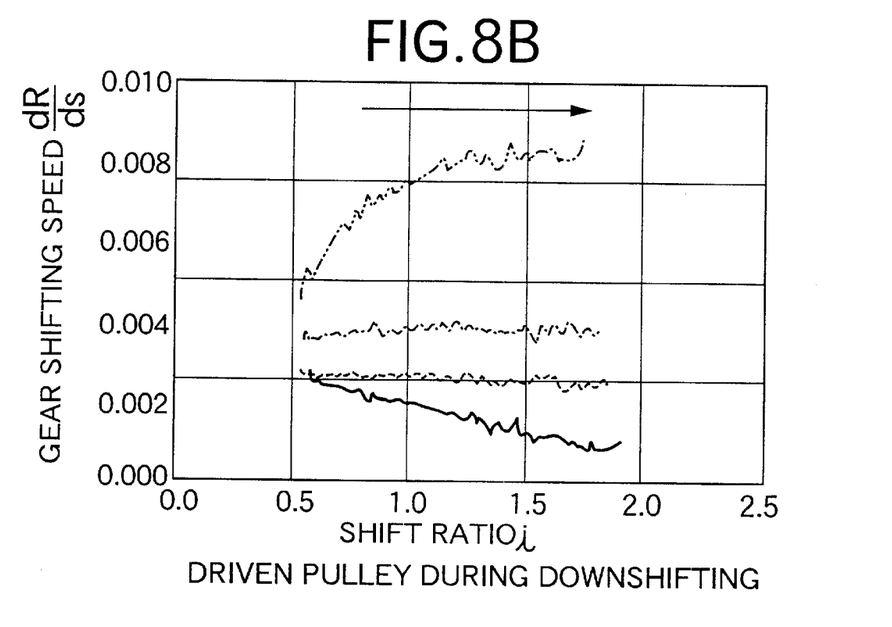

FIGS. 8A and 8B are graphs showing the relationship between the gear shifting speed dR/ds and the shift ratio i in the drive pulley during the upshifting and the driven pulley during the downshifting, namely, in the pulley around which the metal belt is wound with an increased radius for various axial thrusts $Q_{high}$. In FIGS. 8A and 8B, the smaller axial thrust $Q_{low}$ is set at 6 kN; the input rotational speed $N_{IN}$ is set at 300 rpm, and the input torque $T_{IN}$ is set at 0 Nm.

As is apparent from FIGS. 8A and 8B, it is confirmed that in regions where the axial thrust $Q_{high}$ is of 12 kN, 15 kN and 20 kN, the gear shifting speed dR/ds is increased with an increase in the axial thrust $Q_{high}$ with little affection by the shift ratio i. This proves the validity of the gear shifting mechanism that the radius of winding of the metal belt is increased by the resilient deformation of the metal element provided by the axial thrust $Q_{high}$ described in FIG. 4.

However, in a region where the axial thrust $Q_{high}$ is of 35 kN, the gear shifting speed dR/ds is varied in accordance with the shift ratio i and hence, the above-described shifting mechanism does not apply to this case. It is considered that this is because the following gear shifting mechanism is not established: when the axial thrust $Q_{high}$ is increased to 35 kN, even in the pulley around which the metal belt is wound with the increased radius, the total average friction coefficient $\mu_{AV}$ is fixed at a large value as shown by a line of axial thrust $Q_{high}$=35 kN in FIGS. 5A and 6B, causing the full slipping to occur between the metal element and the pulley and hence, the radius of winding of the metal belt is increased by the resilient deformation of the metal element.

From the foregoing, if the relationship between the gear shifting speed dR/ds and the axial thrust $Q_{high}$ is previously stored as a map in a region where a linear relationship is established between the gear shifting speed dR/ds and the larger axial thrust $Q_{high}$ in FIGS. 8A and 8B, namely in a region where the axial thrust $Q_{high}$ is of 8 kN to 26 kN, the control of the gear shifting speed dR/ds of the metal belt-type continuously variable transmission can be carried out properly by searching an axial thrust $Q_{high}$ required for obtaining a target gear shifting speed dR/ds in the map to conduct a feedforward control.

Figure 9:
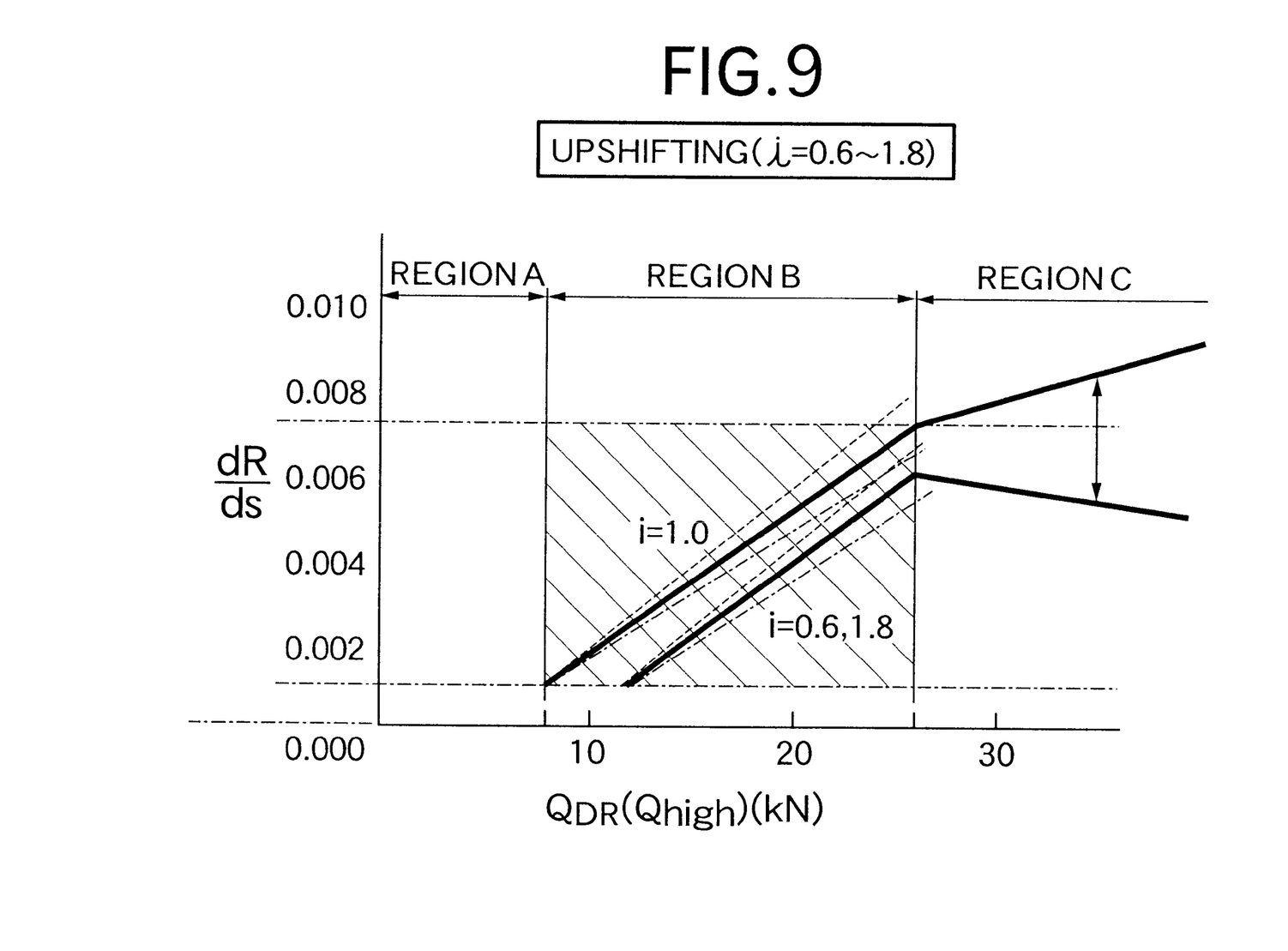
FIG. 9 is a diagram for explaining a technique for controlling the axial thrust $Q_{high}$ of a drive pulley in the upshifting course.

FIG. 9 is a diagram for explaining a technique for controlling the axial thrust $Q_{high}$ of the drive pulley around which the metal belt is wound with the increased radius in the upshifting course. A region B where the axial thrust $Q_{high}$ of the drive pulley is of 8 kN to 26 kN is a region where a linear relationship is established between the gear shifting speed dR/ds and the axial thrust $Q_{high}$ without being affected by the shift ratio i, the input rotational speed $N_{IN}$, the input torque $T_{IN}$ and an axis-axis force FS between the drive pulley and the driven pulley. In this region B, the axial thrust $Q_{high}$ is subjected to the feedforward control, so that the target gear shifting speed dR/ds is obtained based on the relationship between the previously known gear shifting speed dR/ds and the axial thrust $Q_{high}$.

A region A where the axial thrust $Q_{high}$ is of 8 kN or less, is a region where the gear shifting speed dR/ds is affected by both of the axial thrust $Q_{DR}$ of the drive pulley and the axial thrust $Q_{DN}$ of the driven pulley. In this region A, the above-described linear relationship is not established and hence, it is necessary to subject the axial thrust $Q_{high}$ of the drive pulley to a feedback control, so that the gear shifting speed dR/ds detected by a sensor is equal to the target gear shifting speed dR/ds. Likewise, a region C where the axial thrust $Q_{high}$ is of 26 kN or more, is a region where the gear shifting speed dR/ds is varied in accordance with the shift ratio i and the input rotational speed $N_{IN}$. In this region C, the total average friction coefficient $\mu_{AV}$ assumes a constant value, and the linear relationship is not established. Therefore, it is necessary to subject the axial thrust $Q_{high}$ of the drive pulley to the feedback control, so that the gear shifting speed dR/ds detected by the sensor is equal to the target gear shifting speed dR/ds. A region where the gear shifting speed dR/ds is extremely small (dR/ds<0.001), is a boundary region between a steady state and a gear shifting state, where the linear relationship is not established. Therefore, even in this region, it is necessary to subject the axial thrust $Q_{high}$ of the drive pulley to the feedback control.

Figure 10:
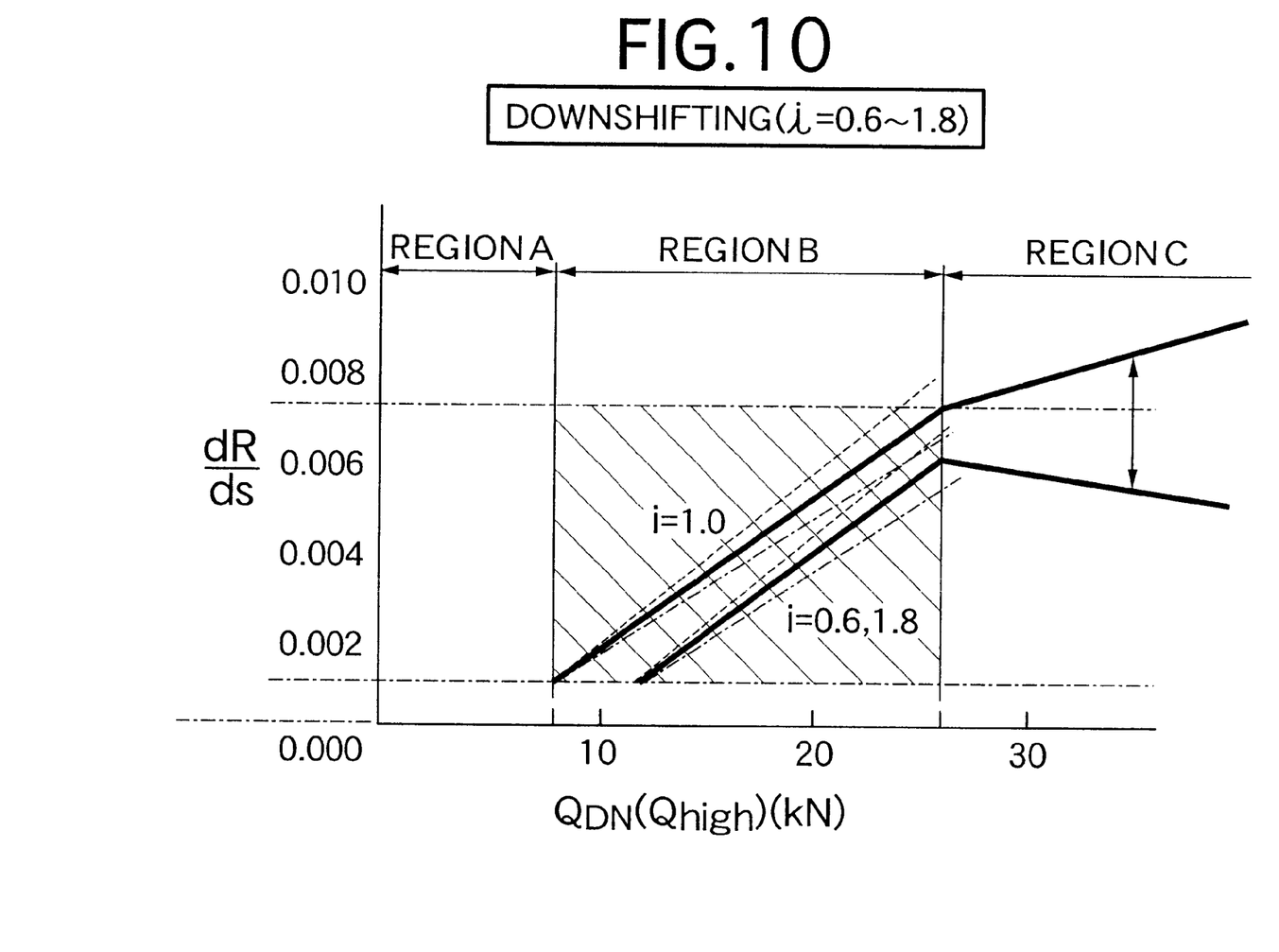
FIG. 10 is a diagram for explaining a technique for controlling the axial thrust $Q_{high}$ of a driven pulley in the downshifting course.

FIG. 10 is a diagram for explaining a technique for controlling the axial thrust $Q_{high}$ of the driven pulley around which the metal belt is wound with the increased radius in the downshifting course. The content of FIG. 10 is substantially the same as that of FIG. 9 in which the upshifting course is described, and hence, the duplicated description is omitted.

Figure 11:
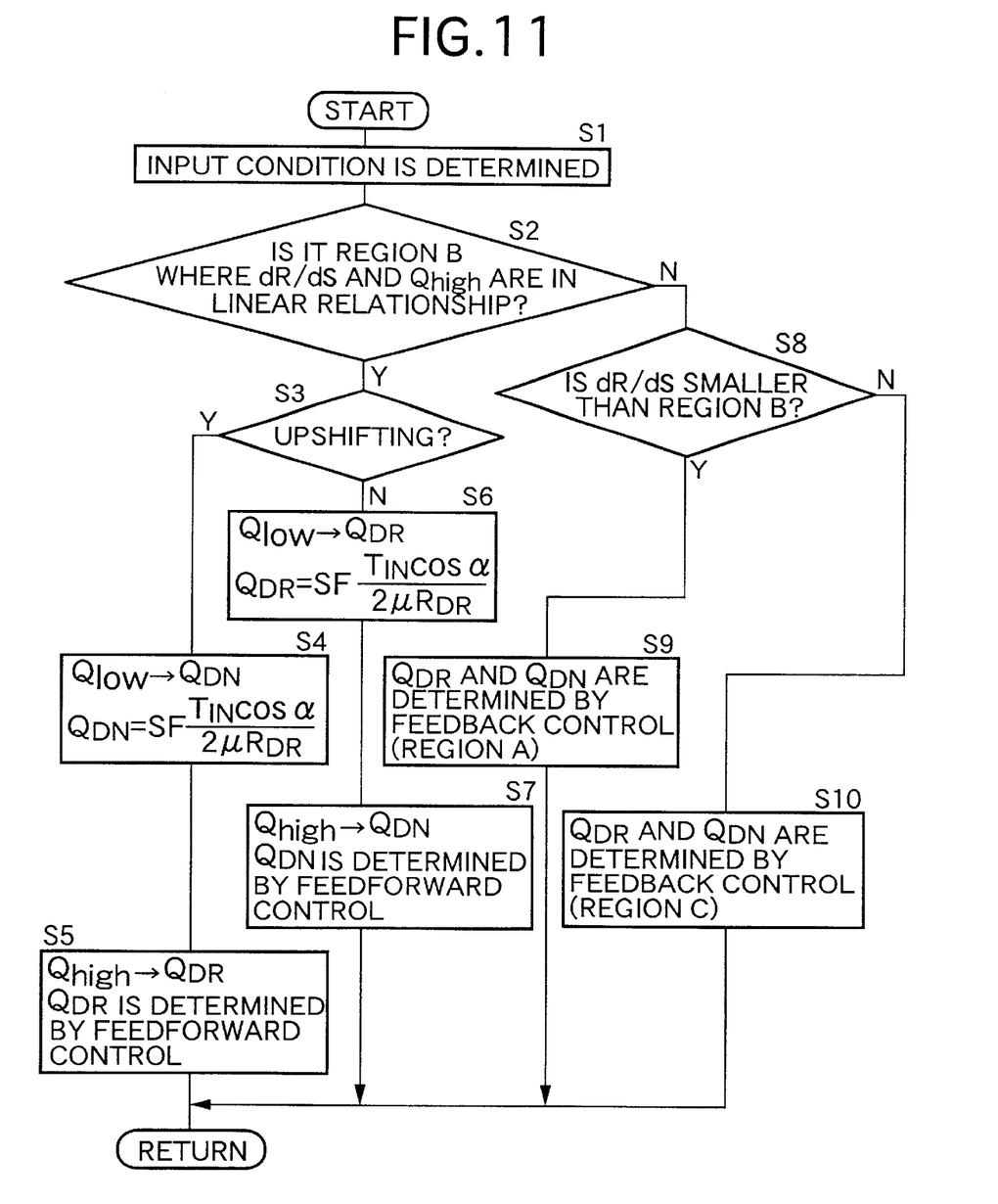
FIG. 11 is a flow chart for determining the axial thrusts $Q_{high}$ and $Q_{low}$.

The course of controlling the axial thrusts $Q_{high}$ and $Q_{low}$ of the pulley can be summarized based on the flow chart in FIG. 11 as follows:

First, at Step S1, the shift ratio i of the metal belt-type continuously variable transmission, the input rotational speed $N_{IN}$, the input torque $T_{IN}$, safety factor SF of the pulley around which the metal belt is wound with the decreased radius and the gear shifting speed dR/ds are read in. At subsequent Step S2, it is determined whether the region is such that the linear relationship is established between the gear shifting speed dR/ds and the larger axial thrust $Q_{high}$ (the region B in FIGS. 9 and 10). If YES, it is determined at Step S3 whether the shifting course is the upshifting or the downshifting.

If the course is the upshifting at Step S3, the smaller axial thrust $Q_{low}$ is determined as the axial thrust $Q_{DN}$ of the driven pulley and the axial thrust $Q_{DN}$ is calculated according to the following equation at Step S4:

$$Q_{DN}=SF\times(T_{IN}\cos\alpha/2\mu R_{DR})$$

wherein α is an inclination angle of the V-face of the pulley; μ is a steady slip limit value of friction coefficient; and $R_{DR}$ is a radius of winding of the metal belt around the drive pulley. Then, at Step S5, the larger axial thrust $Q_{high}$ is determined as the axial thrust $Q_{DR}$ of the drive pulley, and the axial thrust $Q_{DR}$ is searched in a map from the target gear shifting speed dR/ds and subjected to the feedforward control.

On the other hand, if the shifting course is the downshifting at Step S3, the smaller axial thrust $Q_{low}$ is determined as the axial thrust $Q_{DR}$ of the drive pulley and the axial thrust $Q_{DR}$ is calculated according to the following equation at Step S6:

$$Q_{DR}=SF\times(T_{IN}\cos\alpha/2\mu R_{DR})$$

wherein α is an inclination angle of the V-face of the pulley; μ is a steady slip limit value of friction coefficient, and $R_{DR}$ is a radius of winding of the metal belt around the drive pulley.

Subsequently, at Step S7, the larger axial thrust $Q_{high}$ is determined as the axial thrust $Q_{DN}$ of the driven pulley, and the axial thrust $Q_{DN}$ is searched in the map from the target gear shifting speed dR/ds and subjected to the feedforward control.

If the region is not the region B where the linear relationship is established between the gear shifting speed dR/ds and the larger axial thrust $Q_{high}$ at Step S2, and if the region is the region A where the gear shifting speed dR/ds is smaller than that in the region B at Step S8, the axial thrust $Q_{DR}$ of the drive pulley and the axial thrust $Q_{DN}$ of the driven pulley are subjected to the feedback control at Step S9, so that the target gear shifting speed dR/ds is obtained. If the region is the region C where the gear shifting speed dR/ds is larger than that in the region B at Step S8, the axial thrust $Q_{DR}$ of the drive pulley and the axial thrust $Q_{DN}$ of the driven pulley are subjected to the feedback control at Step S10, so that the target gear shifting speed dR/ds is obtained.

In this way, the first axial thrust $Q_{high}$ is controlled based on the target gear shifting speed dR/ds in the region B where the relationship between the gear shifting speed dR/ds and the larger axial thrust $Q_{high}$ is maintained substantially linearly. Therefore, the gear shifting speed can be controlled properly and stably to the target value with a high responsiveness by the simple feedforward control. In addition, the axial thrust $Q_{high}$ required for obtaining the target gear shifting speed dR/ds can be predicted at the time of designing. Therefore, the required gear shifting speed dR/ds can be obtained without use of an excessive-capacity hydraulic pressure system, thereby avoiding problems of increases in friction and cost due to an increase in size of the hydraulic pressure system. Moreover, the control of the gear shifting speed dR/ds can be carried out without hindrance in all the regions by carrying out the feedback control of the axial thrust $Q_{high}$ to obtain the target gear shifting speed dR/ds in the regions A and C where the linear relationship is not established.

If the thickness of the metal element is reduced, the number of the metal elements clamped in the pulley per unit time is increased and hence, the metal elements are liable to be moved radially outwards of the pulley around which the metal belt is wound with the increased radius, thereby increasing the gear shifting speed dR/ds. In addition, even if the rigidity of the metal element is decreased, the metal element clamped in the pulley around which the metal belt is wound with the increased radius is largely compressed and deformed by the axial thrust $Q_{high}$, thereby increasing the gear shifting speed dR/ds. In this way, if the thickness of the metal element is decreased, or if the rigidity of the metal element is decreased, the gear shifting speed dR/ds can be increased as shown by broken lines in FIGS. 9 and 10. Reversely, if the thickness of the metal element is increased, or if the rigidity of the metal element is increased, the gear shifting speed dR/ds can be reduced as shown by dashed lines in FIGS. 9 and 10.

Although the embodiment of the present invention has been described in detail, it will be understood that the present invention is not limited to the above-described embodiment, and various modifications may be made without departing from the subject matter of the invention defined by the claims.

What is claimed is:

1. A process for controlling a gear shifting speed in a metal belt continuously variable transmission comprising:

a metal belt comprised of a large number of metal elements carried on metal ring assemblies, said metal belt being wound around a drive pulley and a driven pulley;

a first axial thrust being applied to one of said pulleys; and a second axial thrust smaller than said first axial thrust being applied to the other pulley, thereby increasing a radius of winding of the metal belt around said one pulley to which said first axial thrust has been applied, and decreasing a radius of winding of the metal belt around said other pulley to which said second axial thrust has been applied to change a shift ratio;

wherein said first axial thrust is subjected to a feedforward control based on a target gear shifting speed in a region where the relationship between said first axial thrust and the gear shifting speed defined as a value obtained by differentiating the radius of winding of the metal belt around said one pulley by an amount of tangential movement of the metal belt is maintained substantially linearly.

2. A process for controlling the gear shifting speed in a metal belt continuously variable transmission according to claim 1, wherein said first axial thrust is subjected to a feedback control, so that said gear shifting speed becomes equal to the target gear shifting speed, in regions where the relationship between said gear shifting speed and said first axial thrust is not maintained substantially linearly.

* * * * *